March 12, 1957  R. ROUSSE  2,784,496
DEVICES FOR THE MEASURING AND RECORDING OF THE
WARPAGE AND BUCKLING OF RAILWAY TRACKS
Filed April 7, 1954  2 Sheets-Sheet 2
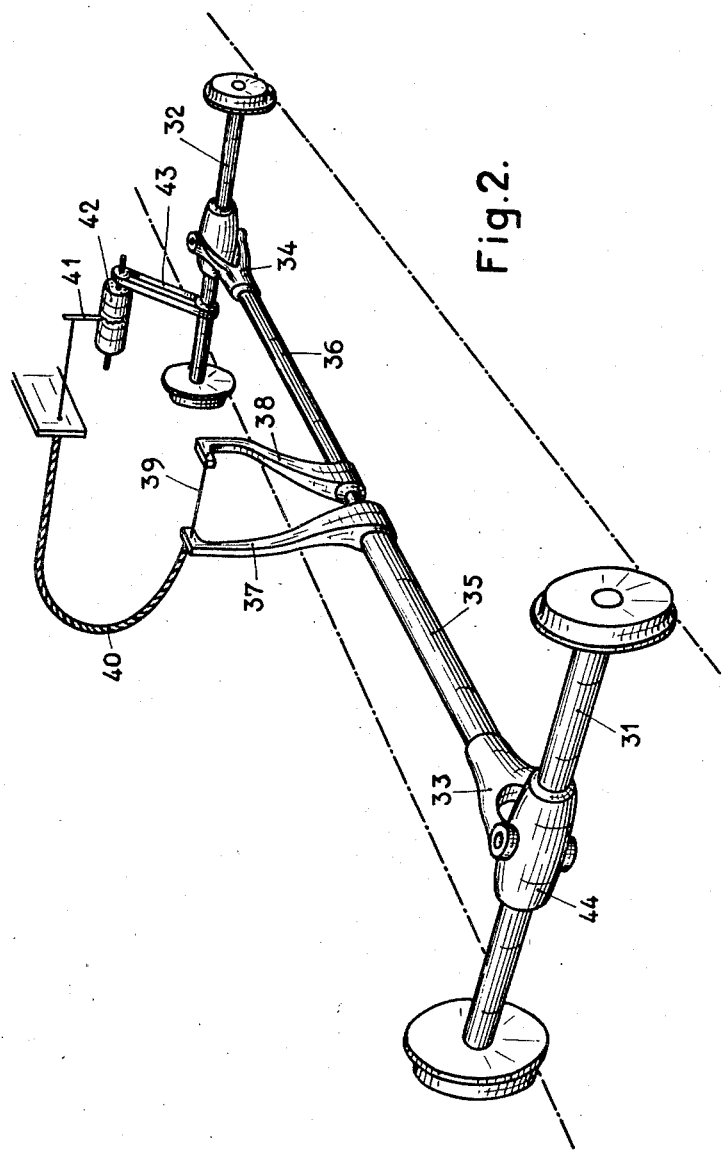
INVENTOR
ROBERT ROUSSE
BY
Kane, Dalsimer and Kane
ATTORNEYS

United States Patent Office 2,784,496
Patented Mar. 12, 1957

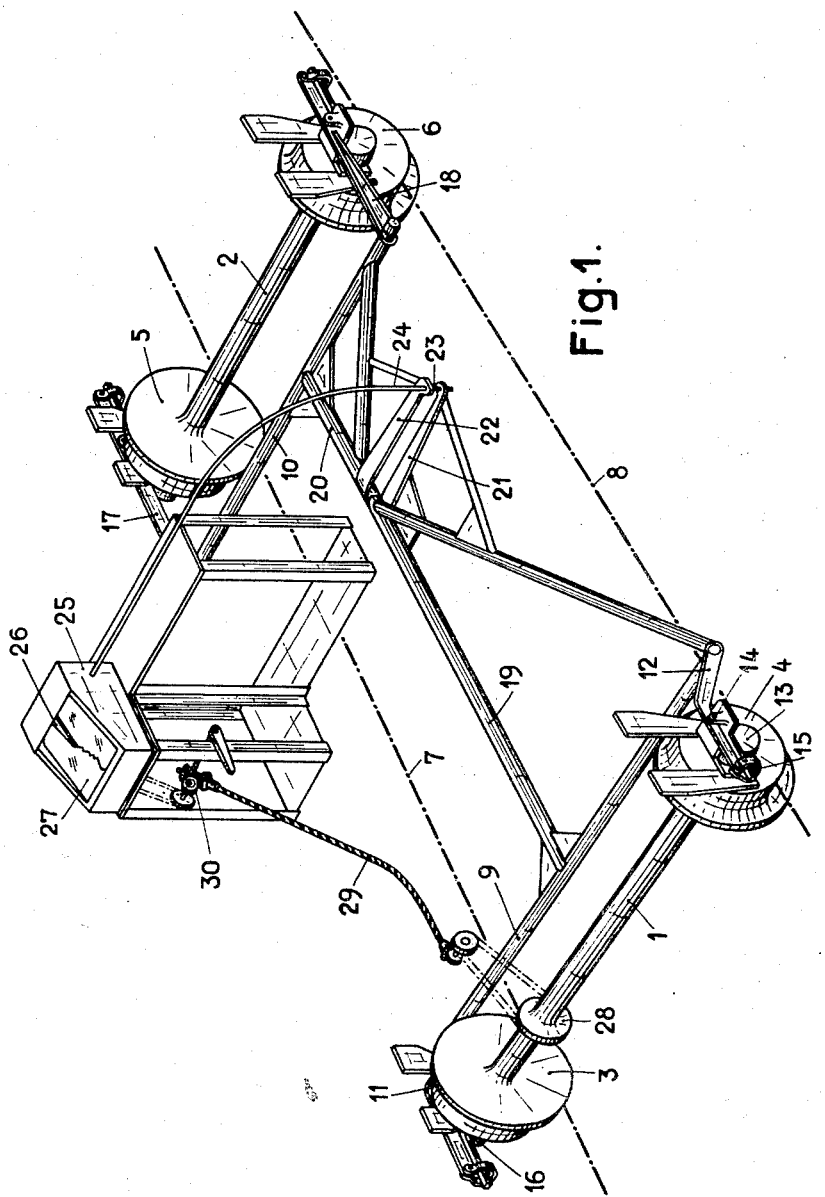

2,784,496

DEVICES FOR THE MEASURING AND RECORDING OF THE WARPAGE AND BUCKLING OF RAILWAY TRACKS

Robert Rousse, Argenteuil, France, assignor to Materiel Industriel S. A., Lausanne, Switzerland, and Constructions Mecaniques S. A., Renens, Switzerland, as joint owners Application April 7, 1954, Serial No. 421,593

Claims priority, application France April 10, 1953

4 Claims. (Cl. 33—174)

The present invention relates to a device for measuring and recording the warpage and buckling of lines of rails, particularly but not exclusively those of a railway track.

It is known that for four-wheeled vehicles to hold the track satisfactorily when in motion it is necessary that a certain deflection of the centre of one wheel, outside the plane passing through the centres of the other three wheels, should not be exceeded.

The deflection thus defined causes a similar deflection of the wheels' points of contact on the plane of travel. It is this deflection, relative to a predetermined track and wheelbase, which is described as "warpage or buckling."

The consequences of warpage or buckling are particularly serious in the case of railway vehicles where the vehicle is guided solely by the weak guard flange of the wheels on the rail.

Various methods of measuring warpage and buckling are known.

It is possible, for instance, to determine the distance from the centre of a wheel to a defined plane by means of a rigid chassis integral with the three other wheel centres.

It is also possible to measure the centre to centre distances of the four wheels in relation to a reference plane and then to deduce from that the relative warpage and buckling on these four wheels.

The first of these two methods calls for an unsymmetrically loaded, unsprung chassis, thus involving the need for a single direction of travel and rendering rapid displacement impossible.

The second method requires, in order to enable a valid reference plane to be obtained, a very rigid chassis supported on numerous axles; whatever precautions are taken, these constructions will never insure complete freedom of the chassis movements from those of the four measuring wheels. Practically speaking, measurements can only be taken to an accuracy of ±4 mm.

With a view to facilitating the measurement of the warpage and buckling and enabling it to be accurately recorded, the device according to the present invention embodies two parallel axles, arranged at a distance from one another, of which the two pairs of wheels are compelled to rest on the rails, each pair being in operative connection with a rotative member oscillating angularly as a function of the inclination in its transverse vertical plane of the axle connecting the centres of the said wheels, these angular displacements being finally communicated to co-axial, rotative elements the angle positions of which are thus compared and their differences transmitted to an apparatus which records them.

The annexed drawing illustrates two typical embodiments of the object of the invention, given by way of example.

Each of the two figures refers to one of the said embodiments which it represents semi-diagrammatically and in perspective.

In the first embodiment, as shown in Fig. 1, the two parallel axles, arranged at a distance from one another, are composed of the axles 1 and 2 carrying the pairs of wheels 3—4 and 5—6.

The wheels and axles thus formed belong to a vehicle, the chassis of which is not illustrated, and are loaded in such a way that the four wheels are constantly applied to the path of travel of the lines of rails on the railway track to be checked. The said lines are represented by the two rows of dots and dashes 7 and 8.

Parallel to each axle there is arranged a cross bar 9, for the axle 1—3—4, and a cross bar 10, for the axle 2—5—6.

An examination of the cross bar 9 shows that its two ends are connected to the ends of levers 11 and 12 respectively which are supported on axle boxes, the box 13 for example, by means of an articulation piece 14 in the case of the lever 12, the said articulation piece being counter-balanced by a spring located at 15. The arrangement is similar in the case of the lever 11 in relation to the axle box 16 of the wheel 3.

In an identical manner the cross bar 10 is supported on two levers 17 and 18 in relation to the wheels 5 and 6.

It can thus be seen that the ends of the two bars 9 and 10 will follow, without deformation or checking, the movements of the wheel centres, which is equivalent to saying that they constitute members oscillating angularly as a function of the inclination in their transverse vertical planes of the axles connecting the wheels centres of the two pairs of wheels.

Secured to the middle of each bar 9 and 10 and perpendicularly to the latter are two co-axial braces 19 and 20 which meet so that, as they form co-axial rotative elements, they will each turn as a function of the oscillation of the cross bars, 9 and 10 respectively, which carry them.

Near the point where they meet, these braces are provided with transverse levers of equal length, a lever 21 for the brace 19 and a lever 22 for the brace 20. These levers participate in the angular displacements of the two braces and, as they are co-axial and equal in length, the distance between their ends will provide a comparison between the respective oscillations of bars 9 and 10, or, in other words, of the axles of the two pairs of wheels in their transverse vertical planes.

The end of the lever 21 is connected to a cable 23 and that of the lever 22 to a sheath 24 surrounding the said cable, thus enabling the variations of the comparative values to be transmitted to the recording apparatus 25, the pen 26 of which traces the values on a recording strip 27.

The displacement of this strip is in its turn proportional to the distance travelled by the axles, as it is controlled from the pulley 28 of the axles 1 by means of a flexible cable 29 and gears 30 the purpose of which is to enable the direction of transmission to be reversed when the travelling direction of the vehicle supporting the device described is also reversed, and to ensure that the strip 27 always moves in the same direction of writing.

The mode of operation of the device represented is clearly shown by the description given in the foregoing. As the warpage and buckling is revealed by the differences in inclination of the axles of the two pairs of wheels, it is also revealed by the relative displacement of the two levers 21 and 22. This, then, is the displacement which the apparatus 25 records as a true value or possibly amplified by an appropriate device.

The embodiment described is applicable both to vehicles with axles and to independent wheels, since in fact it records the position of the centres of the said wheels. It is also possible to use the described method of measuring warping and buckling on road surfaces and, quite generally, in the measuring of surfaces.

Also worthy of note is an arrangement which is independent of the actual axles but effects measurements from the wheel centres and can be directly adapted to any four-wheeled vehicle without involving any essential modifications in the latter's design nor, particularly, in its suspension and distribution of load, thus enabling the vehicle's own wheels to be used as measuring wheels and therefore ensuring that the measurements will be taken on a well-established tread.

In addition, the mechanism, being entirely symmetrical, is reversible, thus enabling measurements to be taken in both directions of travel.

The movements of the chassis of the vehicle exert, moreover, no influence whatsoever on the result of the measurements recorded.

In the second embodiment of the invention, as shown diagrammatically and in perspective in Fig. 2, the transverse axles 31 and 32 of the two pairs of wheels are joined at their centres by universal joints 33 and 34 to co-axial, longitudinal, rotative elements. The latter are composed of a tube 35 which is connected to the universal joint 33 and into which a rod 36, connected to the other universal joint 34, engages and turns freely.

Connected to the tube and to the rod are levers 37 and 38 respectively which are of equal length and, as can easily be seen, play the same part as the levers 21 and 22 in the previous embodiment. They are in fact caused to rotate by the angular displacements of the tube 35 and the rod 36, which in their turn depend on the inclinations of the axles 31 and 32 in their respective transverse vertical planes.

Starting from the ends of the levers 37 and 38, the mechanism is similar to the one described previously; that is to say, it comprises a cable 39, a sheath 40, a pen 41 and a recording apparatus 42 driven as a function of the speed of travel by the transmission belt 43.

All that has been said in connection with the previous embodiment is applicable to the present one, including the fact that it can be adapted to any four-wheeled vehicle whatsoever; all that needs to be done is to modify the axles of the said vehicle so that a universal joint can be fitted to them.

The necessary modification can be effected without difficulty by encasing the said axles in sleeves similar to 44 which permit rotation.

What I claim is:

1. A device for measuring and recording the warpage and buckling of lines of rails, particularly but not exclusively those of a railway track, said device being capable of associating with a vehicle frame, said device including two parallel axles positioned at a distance one from the other under the said frame, a pair of wheels on each of said axles, said wheels being adapted to rest on said rails, a pair of rotative members, each of said rotative members being operatively connected to one of said pairs of wheels and being adapted to oscillate angularly as a function of the inclination in its transverse vertical plane of the axles connecting the wheels of each pair, a pair of coaxial rotative elements adapted to move only rotationally about their axis, one of said pairs of coaxial rotative elements being operatively associated with one of said rotative members to receive angular displacement therefrom and the other of said pairs of coaxial rotative elements being operatively associated with the other of said rotative members to receive angular displacement therefrom whereby the angular positions of said coaxial rotative elements may be compared relative to each other.

2. A device as in claim 1, with each of said rotative members being attached to one of said axles by being connected at their ends to the centres of their respective wheels whereby said rotative members incline in a transverse vertical plane as a function of the corresponding inclination of the axles connecting said wheels' centres, said two rotative members being connected one to each of said coaxial rotative elements, a recorder and means for measuring and transmitting the difference in the angular displacement of said coaxial rotative elements to said recorder.

3. A device as in claim 1, with each of said rotative members being attached to one of said axles by being connected at their ends to the centres of their respective wheels whereby said rotative members incline in a transverse vertical plan as a function of the corresponding inclination of the axles connecting the said wheels' centres, the said two rotative members being connected one to each of said coaxial rotative elements, lever arms of equal length on each of said coaxial rotative elements, a recorder and means for measuring and transmitting to said recorder the varying difference of the distance between the ends of said lever arms.

4. A device as in claim 1, with each of said rotative members being attached to one of said axles by being connected at their ends to the centres of their respective wheels whereby said rotative members incline in a transverse vertical plane as a function of the corresponding inclination of the axles connecting the said wheels' centres, the said two rotative members being connected one to each of said coaxial rotative elements, lever arms of equal length on each of said coaxial rotative elements, a recorder and means for measuring and transmitting to said recorder the varying difference of the distance between the ends of said lever arms, said means for measuring and transmitting including a cable secured to the end of one of said lever arms and a sheath surrounding said cable and being secured to the end of the other said lever arm, both said cable and said sheath being connected to said recorder.

References Cited in the file of this patent

UNITED STATES PATENTS

| | | |
|---|---|---|
| 1,633,535 | Lusk | June 21, 1927 |
| 1,778,287 | Beck | Oct. 14, 1930 |
| 2,058,564 | Carter | Oct. 27, 1936 |
| 2,167,081 | Mauzin | July 25, 1939 |